Feb. 21, 1961  R. S. HALL  2,972,441
VARIABLE BLADE SYSTEM
Filed May 14, 1957

INVENTOR.
Russell S. Hall
BY
Paul Fitzpatrick
ATTORNEY

United States Patent Office 2,972,441
Patented Feb. 21, 1961

2,972,441
VARIABLE BLADE SYSTEM

Russell S. Hall, Indianapolis, Ind., assignor to General Motors Corporation, Detroit, Mich., a corporation of Delaware Filed May 14, 1957, Ser. No. 659,742
1 Claim. (Cl. 230—114)

My invention relates to variable angle blade systems for axial-flow compressors and the like, and is directed to providing an improved structure of an axial-flow machine in which the stator blades are rotatable to vary the geometry of the machine.

It has long been realized that axial-flow machines such as compressors can be made more adaptable to varying flow conditions and speeds of operation by varying the setting of the blades. It is more feasible to adjust the stator blades of such machines than the rotor blades. My invention is directed to a variable stator blade structure which is particularly suited to compact lightweight compressors such as are employed in gas turbine engines. The preferred embodiment of the invention provides a compact structure by which the blades of various stator stages may be adjusted independently.

The nature of the invention and the advantages thereof will be more clearly apparent to those skilled in the art from the succeeding detailed description of the preferred embodiment of the invention and the accompanying drawings.

Figure 1:
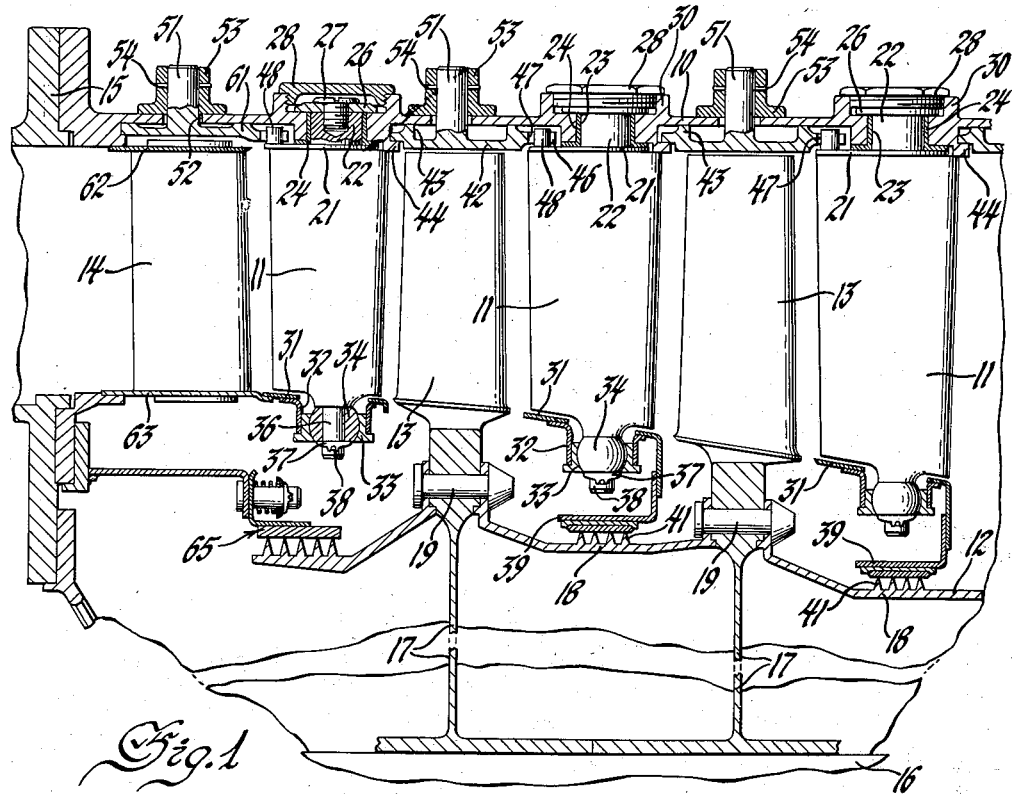
Figure 1 is a partial sectional view of an axial-flow compressor taken on a plane containing the axis of the compressor.
Figure 2:
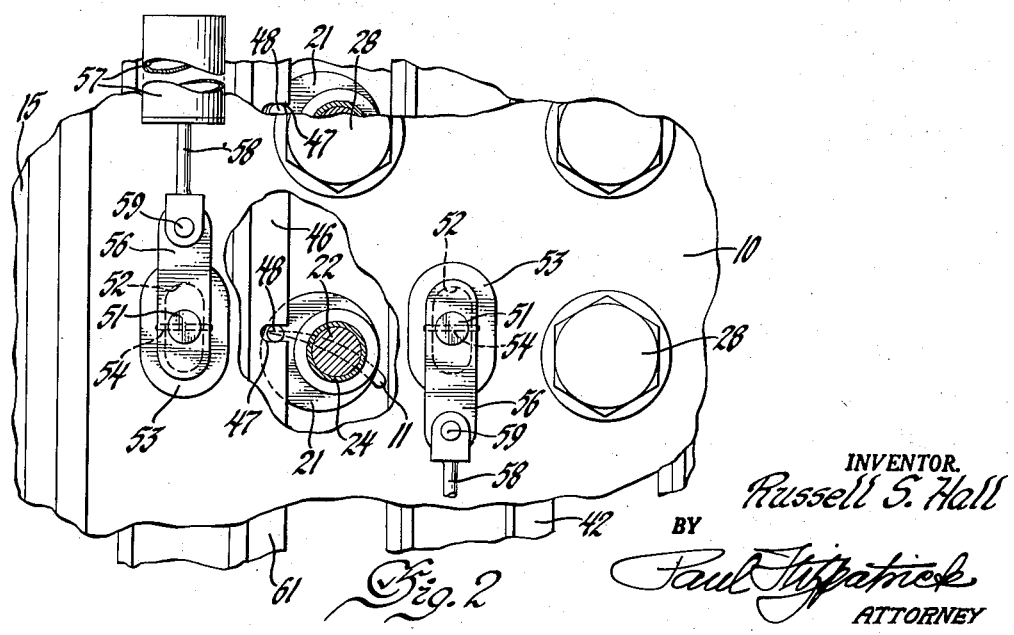
Figure 2 is a fragmentary plan view with parts cut away, and in section.

The compressor comprises an annular case 10 within which a number of rows of adjustable stator blades 11 are mounted. Rotor 12 coaxial with the case bears stages of rotor blades 13 alternating with the stator blades. A ring of fixed exit guide vanes 14 may be mounted behind the last stage of adjustable stator vanes 11. Air flows through the compressor from right to left as viewed in the figure, passing alternately through the rotor and stator blade rows and then through the exit guide vanes into an exhaust diffuser 15 which is connected by the usual bolting flange to the discharge end of the compressor case.

The structure of the rotor is immaterial to the present invention. As illustrated, it comprises a shaft or tie bolt 16 on which are mounted a number of rotor disks 17 joined by rotating seal rings 18 at their peripheries. The seal rings are fixed to the disks by bolts 19. The rotor blades 13 are suitably mounted in the rims of the disks 17. It may be understood that any number of stages of blading may be included in the compressor and that the stator blades of some stages may be fixed.

This invention is concerned with the improved structure of the adjustable stator blading, the preferred embodiment of which is illustrated. Each adjustable stator blade 11 has a generally circular platform 21 at its outer end and a short stub shaft 22 extending from the platform. This stub shaft extends through an opening 23 in a stiffening rib extending circumferentially at the case. The stub shaft 22 is rotatably mounted in the opening by a bushing 24, the cylindrical portion of which provides a bearing for the stub shaft and the flange of which provides a bearing against the outer surface of the blade platform 21. The blade is retained in the case by a washer 26 held on the end of the stub shaft by a screw 27 mounted in a threaded bore in the outer end of the shaft. An interiorly threaded boss 30 projects from the case around each opening 23. This boss receives a hexagon head threaded cover or plug 28 which covers the moving parts and closes the opening against leakage of gas under pressure from the compressor.

The inner ends of the stator vanes 11 support an inner stator blade shroud 31, which may be a fabricated sheet metal ring, to which are brazed sleeves 32 within which are mounted the outer rings 33 of spherical bearings. The trunnion members of the spherical bearings are truncated spheres 34 slipped onto stub shafts 36 extending from the inner ends of the vanes 11. The bearing members 34 may abut the inner end of the blade and may be retained by washers 37 and pins 38 extending through transverse holes in the stub shafts 36.

In most compressors the stator structure is divided into two halves separable on a plane containing the axis of the compressor, commonly called the split line, so that the stator structure may be assembled over the complete rotor. For this reason the inner shroud ring 31 is in two half circular sections, each section supported by a 180 degree segment of stator blades 11.

The spherical bearing structure prevents binding of the blades 11 which would make it difficult to adjust them about a radial axis. Such binding could result, in the absence of the spherical bearing, from bending of the blades due to the gas loads on them when the compressor is in operation.

The inner shroud rings 31 support the outer rings 39 of labyrinth seals which are brazed to the rings 31. These rings cooperate with sealing ribs 41 on the sealing rings 18. The particular seal structure is immaterial to the present invention.

The actuating mechanism for adjusting the angle of the blades 11 comprises a half-circular ring segment 42 which also provides the outer shroud for a row of rotor blades 13. The complete ring provided by the two segments 42 when the case is assembled lies very closely adjacent the tips of the rotor blades to minimize leakage across the tips of the blades. The combined shroud and actuator 42 is of a generally channel section with flanges 43 which bear against the inner wall of the case 10. A projecting flange 44 on the case lies within the rearward edge of ring 42. The forward edge of ring 42 comprises a flange 46 which overlies the blade platforms 21. Notches 47 in this flange adjacent each blade 11 receive pins 48 extending outwardly from each blade platform 21. As will be apparent, by rotating the ring 42 circumferentially of the case, the blades are rotated about the radial axes defined by their shafts 22 to vary the geometry of the compressor. Each half ring 42 is coupled to an external actuator by a pin 51 extending from the outer surface of the ring, preferably approximately 90 degrees from each end of the ring. Pin 51 extends through a short circumferentially extending slot 52 in the case and into a fitting 53 within which it is fixed by a transverse pin 54. The fitting 53 overlies the opening 52 in the case. An extension 56 of fitting 53 is coupled to a suitable actuator of any desired sort.

As illustrated, the actuator is a hydraulic cylinder 57, the piston rod 58 of which is coupled to the member 53 by a pin 59. The cylinder may be mounted on the compressor case by suitable mounting means (not illustrated) and may be supplied actuating fluid by any suitable control means (not illustrated). As will be apparent, the movement of the piston rod 58 will pull or push on pin 51 to slide the shroud 42 circumferentially of the case and thereby vary the setting of the stator blades.

It may be noted that the last stage stator vanes 11 are adjusted by a ring 61 (in two 180 degree segments) which is similar to the shroud rings 42 but does not act as a rotor shroud. Ring 61 is mounted in the case immediately outside the outer ends of the fixed outlet guide vanes 14 which are mounted in an outer shroud 62 and an inner shroud 63 fixed to the outlet end of the compressor case. Ring 61 is actuated by a pin 51 extending from each segment connected to an actuator as described in connection with ring 42.

The drawing also shows a compressor outlet labyrinth seal indicated generally as 65, the structure of which is immaterial to the invention to which this application is directed. The seal is the subject matter of my U.S. patent application S.N. 660,021, filed May 14, 1957.

The compact and lightweight character of the variable vane structure shown and described and its suitability for lightweight axial-flow compressors will be apparent to those skilled in the art. The structure is easily assembled and has the advantage that the vane actuating rings also provide the shrouding for the rotating stages. The structure involves substantially no increase in the radial dimensions of the compressor case.

The description herein of the preferred embodiment of the invention for the purpose of explaining the principles thereof is not to be construed as limiting the invention, as many modifications may be made within the scope of the invention by the exercise of skill in the art.

I claim:

An axial-flow compressor comprising, in combination, an annular case, a stage of stator blades therein disposed in a ring circumferentially of the case, each blade having a platform at the outer end thereof and a shaft extending from the platform through an opening in the case, an arcuate actuator mounted in the case for movement circumferentially thereof adjacent the blade platforms, a motion-transmitting coupling between each blade platform and the actuator disposed radially outward of the platform for rotation of the blades about axes extending radially of the case, a rotor including a row of rotor blades adjacent the stator blades, the actuator being a blade shroud for the stage of rotor blades, closely adjacent the tips of the blades and having a substantially unbroken inner surface defining a boundary of the flow path through the stage, a pin extending radially outwardly from the actuator through a circumferentially extending slot in the case, a member coupled to the pin covering the slot, and means coupled to the pin for reciprocating the pin and thereby moving the actuator.

References Cited in the file of this patent

UNITED STATES PATENTS

| | | |
|---|---|---|
| 486,761 | Clark | Sept. 23, 1952 |
| 2,671,634 | Morley | Mar. 9, 1954 |
| 2,778,564 | Halford et al. | Jan. 22, 1957 |

FOREIGN PATENTS

| | | |
|---|---|---|
| 731,822 | Great Britain | June 15, 1955 |